(12) United States Patent
Czaja et al.

(10) Patent No.: US 7,035,648 B2
(45) Date of Patent: Apr. 25, 2006

(54) SYNCHRONIZATION OF MOBILE STATION LOCATION MEASUREMENT WITH CDMA SERVICE

(75) Inventors: Stanislaw Czaja, Cardiff, CA (US); Paul Wei, San Diego, CA (US); Anthony Lee, San Diego, CA (US)

(73) Assignee: VIA Telecom Co., Ltd., San Diego, CA (US)

( * ) Notice: Subject to any disclaimer, the term of this patent is extended or adjusted under 35 U.S.C. 154(b) by 424 days.

(21) Appl. No.: 10/264,021

(22) Filed: Oct. 2, 2002

(65) Prior Publication Data

US 2003/0100314 A1    May 29, 2003

Related U.S. Application Data

(60) Provisional application No. 60/334,214, filed on Nov. 29, 2001.

(51) Int. Cl.
*H04B 17/00* (2006.01)
(52) U.S. Cl. .................. 455/456.1; 455/456.2; 455/456.6; 455/414.1; 455/67.11; 455/528
(58) Field of Classification Search .. 455/456.1–456.5, 455/414, 528, 67.11, 456.6, 414.1
See application file for complete search history.

(56) References Cited

U.S. PATENT DOCUMENTS

| | | | | |
|---|---|---|---|---|
| 6,138,010 A | * | 10/2000 | Rabe et al. | 455/426.1 |
| 6,321,090 B1 | * | 11/2001 | Soliman | 455/440 |
| 6,337,983 B1 | * | 1/2002 | Bonta et al. | 455/437 |
| 6,721,572 B1 | * | 4/2004 | Smith et al. | 455/456.1 |
| 6,751,468 B1 | * | 6/2004 | Heubel et al. | 455/518 |
| 2003/0013441 A1 | * | 1/2003 | Bhogal et al. | 455/423 |
| 2004/0203728 A1 | * | 10/2004 | Schwinke et al. | 455/425 |
| 2004/0203855 A1 | * | 10/2004 | Veerasamy et al. | 455/456.1 |

* cited by examiner

*Primary Examiner*—Charles Appiah
*Assistant Examiner*—Khawar Iqbal
(74) *Attorney, Agent, or Firm*—Preston Gates & Ellis LLP

(57) ABSTRACT

A method of synchronizing measurement of a mobile station location with communications service includes performing communications service between the mobile station and a base station, transmitting a synchronization message from the mobile station to the base station to indicate that the mobile station will be unavailable for communications service during a selected time interval, measuring the mobile station location from the mobile station during the selected time interval, and resuming communications service between the mobile station and the base station.

21 Claims, 9 Drawing Sheets

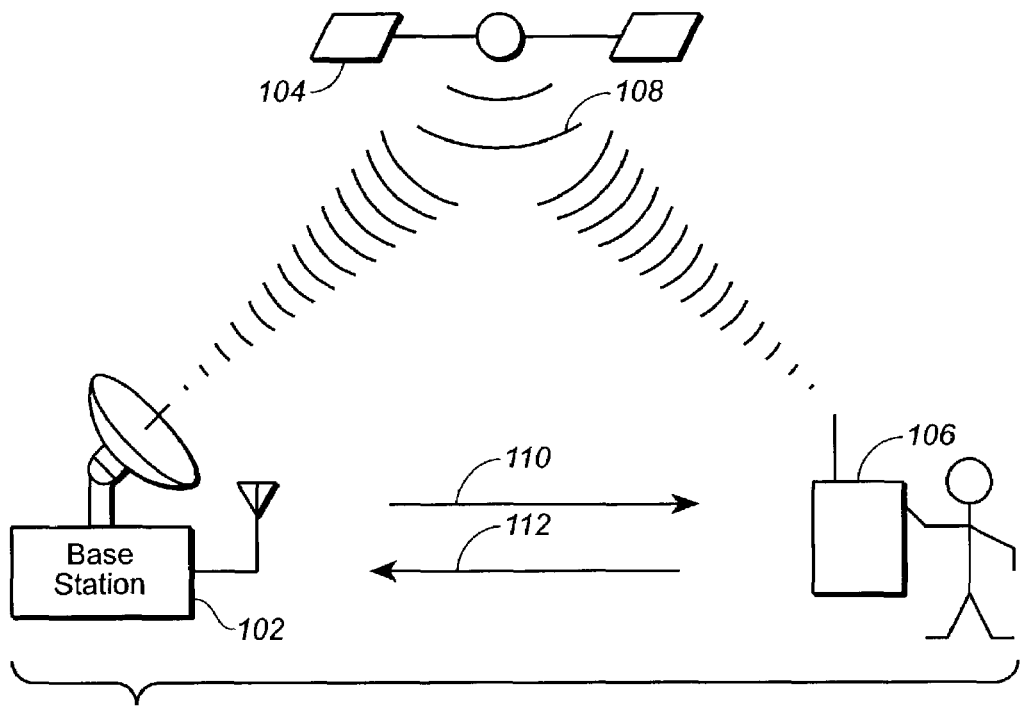
FIG._1
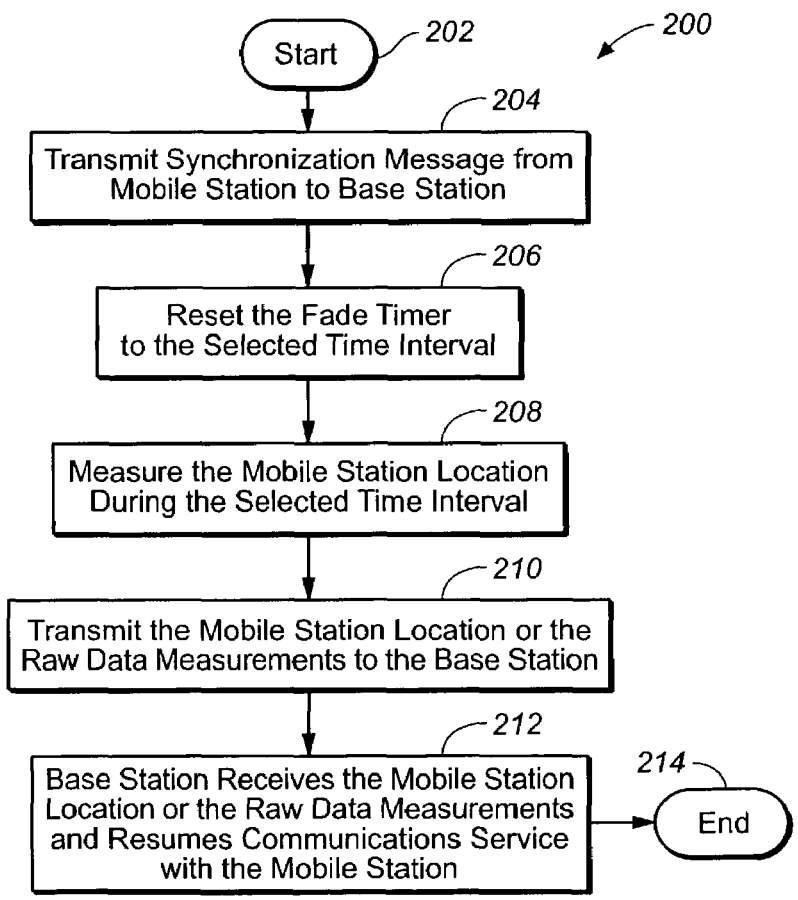
FIG._2

1.1.2.2 CDMA Numeric Information

CDMA_OFF_TIME_REP_SUP_IND$_s$: CDMA off time report supported indicator.

CDMA_OFF_TIME_REP_THRESHOLD$_s$: CDMA off time report threshold.

FIG._3

2.6.2.2.5 Extended System Parameters Message

[...]

- Pilot information request supported indicator (PILOT_INFO_REQ_SUPPORTED$_s$ = PILOT_INFO_REQ_SUPPORTED$_r$).

- CDMA off time report supported indicator (CDMA_OFF_TIME_REP_SUP_IND$_s$ = CDMA_OFF_TIME_REP_SUP_IND$_r$).

- If CDMA_OFF_TIME_REP_SUP_IND$_r$ is equal to '1', the mobile station shall store:

- CDMA off time report threshold (CDMA_OFF_TIME_REP_THRESHOLD$_s$ = CDMA_OFF_TIME_REP_THRESHOLD$_r$ in units specified by CDMA_OFF_TIME_REP_UNIT$_r$).

FIG._4

2.6.2.2.14.1 Stored Parameters

[...]

- If QPCH_BI_SUPPORTED$_r$ = '1', the mobile station shall set QPCH_POWER_LEVEL_BCAST$_s$ to QPCH_POWER_LEVEL_BCAST$_r$.

- CDMA off time report supported indicator (CDMA_OFF_TIME_REP_SUP_IND$_s$ = CDMA_OFF_TIME_REP_SUP_IND$_r$).

- If CDMA_OFF_TIME_REP_SUP_IND$_r$ is equal to '1', the mobile station shall store:

- CDMA off time report threshold (CDMA_OFF_TIME_REP_THRESHOLD$_s$ = CDMA_OFF_TIME_REP_THRESHOLD$_r$ in units specified by CDMA_OFF_TIME_REP_UNIT$_r$).

FIG._5

2.6.4.3 Traffic Channel Substate

[...]

- If Layer 3 is requested by the upper layers to query base station identification number, SID, and NID related information for one or more pilots, and PILOT_INFO_REQ_SUPPORTED$_s$ equals '1', mobile station shall send a *Base Station Status Request Message* with a "Pilot Information" record type to the base station.

- If the mobile station needs to suspend its CDMA Traffic Channel processing for applications other than a PUF probe, hard handoff, periodic search, or rescue operation, then, prior to suspending its CDMA Traffic Channel processing, the mobile station shall perform the following:

- If CDMA_OFF_TIME_REP_SUP INDs is equal to '1' and the total time it needs to suspend processing the CDMA Traffic Channel is longer than CDMA_OFF_TIME_REP_THRESHOLDS, the mobile station shall send a *CDMA Off Time Report Message* in assured mode. Otherwise, the mobile shall not send a *CDMA Off Time Report Message*.

- The mobile station may send a *CDMA Off Time Report Message* with CDMA_OFF_TIME_ENABLE set to '0' to cancel a previously reported CDMA Traffic Channel processing suspension.

*FIG. 6*

2.7.2.3.2.40 CDMA Off Time Report Message

MSG_TAG: COTRM

| Field | Length (bits) |
|---|---|
| CDMA_OFF_TIME_ENABLE | 1 |
| CDMA_OFF_TIME_START | 0 or 6 |
| CDMA_OFF_TIME_UNIT | 0 or 2 |
| CDMA_OFF_TIME_MODE | 0 or 1 |
| CDMA_OFF_TIME | 0 or 4 |
| CDMA_OFF_TIME_PERIOD | 0 or 6 |

CDMA_OFF_TIME_ENABLE - Off time reporting enable

The mobile station shall set this field to '1' if the mobile station plans to suspend its CDMA Traffic Channel processing. The mobile station shall set this field to '0' to cancel a previous reported CDMA Traffic Channel processing suspension.

CDMA_OFF_TIME_START - The start time when the mobile station moves away from the CDMA Traffic Channel.

If CDMA_OFF_TIME_ENABLE is set to '0', the mobile station shall omit this field; otherwise, the mobile station shall include this field and set it as follows:

The mobile station shall set this field to the System Time, in units of 80 ms (modulo 64), at which the mobile station plans to go away from the CDMA Traffic Channel.

CDMA_OFF_TIME_UNIT - Time unit use in CDMA_OFF_TIME

If CDMA_OFF_TIME_ENABLE is set to '0', the mobile station shall omit this field; otherwise, the mobile station shall include this field and set it as follows:

The mobile station shall set this field to the time unit used in CDMA_OFF_TIME, as specified in Table 2.7.2.3.2.40-1

FIG._7

Table 2.7.2.3.2.40-1. CDMA Off Time Unit

| CDMA OFF TIME UNIT (binary) | Time Unit (decimal) |
|---|---|
| 00 | 80 ms |
| 01 | 0.5 sec |
| 10 | 1 sec |
| 11 | RESERVED |

CDMA_OFF_TIME_MODE — CDMA off time mode

If CDMA_OFF_TIME_ENABLE is set to '0', the mobile station shall omit this field: otherwise, the mobile station shall include this field and set it as follows:

The mobile station shall set this field to '1' if CDMA_OFF_TIME is periodic, otherwise, the mobile station shall set this field to '0'.

CDMA_OFF_TIME — The total time that the mobile station plans to be away from the CDMA Traffic Channel.

If CDMA OFF TIME ENABLE is set to '0', the mobile station shall omit this field; otherwise, the mobile station shall include this field and set it as follows:

The mobile station shall set this field to one less than the mobile station's estimate of the total time it is off the CDMA Traffic Channel, in unit of CDMA_OFF_TIME_UNIT.

CDMA_OFF_TIME_PERIOD — The time between CDMA_OFF_TIME

If CDMA_OFF_TIME_MODE is set to '0', the mobile station shall omit this field; otherwise, the mobile station shall include this field and set it as follows:

The mobile station shall set this field to the time in units of 10 seconds between the beginning of successive CDMA_OFF_TIME.

*FIG._8*

3.6.4.3 Traffic Channel Substate

[...]

If the base station receives one of the following messages from the mobile station, the base station shall process the message according to the specified requirements, if any:

1. *Base Station Challenge Order:* The base station shall process the message as described in 2.3.12.1.5.

2. *Base Station Status Request Message:* The base station shall process the message as described in 3.6.4.1.9

3. *Call Cancel Message*

4. *Candidate Frequency Search Report Message:* The base station shall process the message as described in 3.6.6.2.2.6.

5. *Candidate Frequency Search Response Message:* The base station shall process the message as described in 3.6.6.2.2.4.

6. <u>*CDMA Off Time Report Message*</u>

7. <u>*Connect Order:*</u> If the CON_REF_INCL field is not included in this message or if the CON_REF_INCL field equals '0', the Layer 3 shall deliver this message to the Call Control instance identified by NULL; otherwise, the Layer 3 shall deliver this message to the Call Control instance identified by CON_REF.

*FIG._9*

3.7.2.3.2.13 Extended System Parameters Message

[...]

| Field | Length (bits) |
|---|---|
| MOB_QOS | 1 |
| ENC_SUPPORTED | 1 |
| SIG_ENCRYPT_SUP | 0 or 8 |
| UI_ENCRYPT_SUP | 0 or 8 |
| USE_SYNC_ID | 1 |
| CS_SUPPORTED | 1 |
| BCCH_SUPPORTED | 1 |
| MS_INIT_POS_LOC_SUP_IND | 1 |
| PILOT_INFO_REQ_SUPPORTED | 1 |
| CDMA_OFF_TIME_REP_SUP_IND | 1 |
| CDMA_OFF_TIME_REP_THRESHOLD_UNIT | 0 or 1 |
| CDMA_OFF_TIME_REP_THRESHOLD | 0 or 3 |

CDMA_OFF_TIME_REP_

SUP_IND — CDMA off time report supported indicator.
If the base station supports mobile station report for CDMA off time information using the *CDMA Off Time Report Message*, the base station shall set this field to '1'; otherwise, the base station shall set this field to '0'.

CDMA_OFF_TIME_REP_

THRESHOLD_UNIT — CDMA off time report unit
If CDMA_OFF_TIME_REP_SUP_IND is set to '0', the base station shall omit this field; otherwise, the base station shall include this field and set it as follows:

The mobile station shall set this field to the time unit used in CDMA_OFF_TIME_REP_THRESHOLD, as specified in Table 3.7.2.3.2.13-5

FIG._10

Table 3.7.2.3.2.13-5. CDMA Off Time Report Threshold Unit

| CDMA_OFF_TIME_UNIT_REP_UNIT (binary) | Time Unit (decimal) |
|---|---|
| 0 | 80 ms |
| 1 | 0.5 sec |

CDMA_OFF_TIME_REP_
THRESHOLD  - CDMA off time report threshold

If CDMA_OFF_TIME_REP_SUP_IND is set to '0', the base station shall omit this field; otherwise, the base station shall include this field and set it as follows:

The base station shall set this field to the time in units of CDMA_OFF_TIME_REP_ THRESHOLD_UNIT such that if the mobile station goes away from the CDMA traffic channel longer than this value, the mobile station is to send a *CDMA Off Time Report Message*.

*FIG._11*

3.7.2.3.2.31 MC-RR Parameters Message

[...]

| Field | Length (bits) |
|---|---|
| SENDING_RAND | 0 or 1 |
| PRI_NGHBR_LST | 0 or 1 |
| USER_ZONE_ID | 0 or 1 |
| EXT_GLOBAL_REDIRECT | 0 or 1 |
| RESERVED | 0 or (NUM_OPT_MSG_4) |
| PILOT_INFO_REQ_SUPPORTED | 0 or 1 |
| CDMA_OFF_TIME_REP_SUP_IND | 1 |
| CDMA_OFF_TIME_REP_THRESHOLD_UNIT | 0 or 1 |
| CDMA_OFF_TIME_REP_THRESHOLD | 0 or 3 |

CDMA_OFF_TIME_REP_SUP_IND — CDMA off time report supported indicator.

If the base station supports mobile station report for CDMA off time information using the *CDMA Off Time Report Message*, the base station shall set this field to '1'; otherwise, the base station shall set this field to '0'.

CDMA_OFF_TIME_REP_THRESHOLD_UNIT — CDMA off time report unit

If CDMA_OFF_TIME_REP_SUP_IND is set to '0', the base station shall omit this field; otherwise, the base station shall include this field and set it as follows:

The mobile station shall set this field to the time unit used in CDMA_OFF_TIME_REP_THRESHOLD, as specified in Table 3.7.2.3.2.13-5

CDMA_OFF_TIME_REP_THRESHOLD — CDMA off time report threshold

If CDMA_OFF_TIME_REP_SUP_IND is set to '0', the base station shall omit this field; otherwise, the base station shall include this field and set it as follows:

The base station shall set this field to the time in units of CDMA_OFF_TIME_REP_THRESHOLD_UNIT such that if the mobile station goes away from the CDMA traffic channel longer than this value, the mobile station is to send a *CDMA Off Time Report Message.*

FIG._12

SYNCHRONIZATION OF MOBILE STATION LOCATION MEASUREMENT WITH CDMA SERVICE

CROSS REFERENCE TO RELATED APPLICATIONS

This patent application claims priority under 35 U.S.C. § 119(e) to U.S. Provisional Patent Application 60/334,214 for METHOD FOR SYNCHRONIZING GPS SEARCH LOCATION SERVICES WITH THE OPERATION OF CDMA SYSTEM, filed Nov. 29, 2001, by Anthony Lee, et al., incorporated herein by reference.

BACKGROUND OF THE INVENTION

The present invention is directed to methods for allocating and scheduling a forward and a reverse traffic channel and rescue channel resources for a code division multiple access (CDMA) communications system. More specifically, but without limitation thereto, the present invention is directed to synchronizing measurement of a location of a mobile station and CDMA communications service.

The Global Positioning System (GPS) is a worldwide radio-navigation system formed from a constellation of 24 satellites and their ground stations. GPS uses these satellites as reference points to calculate positions to an accuracy from a few meters up to less than a centimeter. GPS receivers have been miniaturized to just a few integrated circuits and may be advantageously combined with cellular telephone components to make the technology accessible to virtually everyone.

Basically, GPS is the geometric triangulation of a GPS receiver from at least three of the constellation of GPS satellites. The triangulation is performed by measuring the distance between the GPS receiver and each satellite using the travel time of radio signals. The accuracy of measurement of the travel time of the radio signals limits the accuracy of the triangulation. For example, at the speed of light, a measurement error of only a millionth of a second results in an error of three hundred meters. In addition to distance, the exact position of the satellites must be known. Also, the delays the radio signal experiences as it travels through the atmosphere must be taken into account, that is, the speed of light varies as the radio signal travels through the ionosphere and the atmosphere.

As an example of triangulation, suppose the travel time of the radio signal to a first satellite results in a distance of 22,000 kilometers. The location of the GPS receiver is then limited to a point on the surface of a sphere having a radius of 22,000 kilometers. Next, the distance to a second satellite is measured at 24,000 kilometers. The location of the GPS receiver is therefore on the surface a sphere having a radius of 24,000 kilometers from the second satellite. The location of the GPS receiver is now limited to a point on a circle where the two spheres intersect. If the measurement of the radio signal to a third satellite results in a distance of 26,000 kilometers, the position of the GPS receiver is narrowed down to the two points where the sphere of the third satellite having a 26,000 kilometer radius cuts through the circle that defines the intersection of the first two spheres, which occurs at two points on the circle. From three satellites, the position of the GPS receiver may be narrowed down to one of these two points. To decide which point is the true position, a fourth measurement may be made of the distance from a fourth satellite to the GPS receiver. Usually, however, one of the two points is obviously incorrect (either too far from the Earth or else moving at an impossible velocity) and may be rejected by logic without the necessity of making a fourth measurement. A fourth measurement is useful for another reason that will become apparent later.

Each distance used for the triangulation is calculated from measuring the travel time of a radio signal from the satellite to the GPS receiver. If the satellite is directly overhead, the travel time would be about 0.06 seconds. To achieve an accuracy of one meter from a distance of 20,000 kilometers, the measurement must have a precision of about one in 20 million, which requires eight significant digits. In other words, a travel time of 0.06 seconds must be distinguishable from a travel time of 0.059999999 seconds.

To achieve the required precision, the radio signal is modulated by a pseudo-random code. Each satellite has its own unique pseudo-random code to ensure that the GPS receiver does not confuse the signal from one satellite with that of another, so all the satellites can use the same frequency without jamming each other. The pseudo-random code also make possible the use of information theory to increase the signal-to-noise ratio of the GPS signal, which is why GPS receivers do not require large satellite dishes to receive the GPS signals.

The GPS receiver has a copy of the pseudo-random code pattern used by each satellite. The starting point of the copy is synchronized to universal time by a reference clock in the GPS receiver, and the copy is compared to the demodulated radio signal from the satellite at different delay times until the comparison of the delayed copy with the satellite signal reaches a peak value. The delay time at which the delayed copy matches the satellite signal is identical to the travel time.

The GPS satellites have extremely precise atomic clocks on board, however, both the satellite and the GPS receiver must precisely synchronize the pseudo-random code to accurately measure the travel time. This synchronization may be performed by measuring the distance to a fourth satellite. If the GPS receiver reference clock were perfectly identical to the satellite atomic clock, then all the satellite ranges would intersect at a single point, that is, the position of the GPS receiver. Realistically, however, the clocks are not identical, and the fourth measurement will not intersect with the first three measurements. Because any offset in the reference clock from universal time affects all of the measurements equally, the GPS receiver looks for a common time correction that it can apply to all four timing measurements that would result in their intersecting at a single point, which gives the position of the GPS receiver to the desired accuracy, and the correction is used to synchronize the GPS receiver's clock with universal time kept by the atomic clocks in the satellites.

The pseudo-random code provides a precise delay measurement, and the extra distance measurement synchronizes the reference clock in the GPS receiver to universal time kept by the satellite clock, but for referencing the triangulation to world coordinates, the exact position of the satellites in space must be determined. The high satellite altitude of 22,000 kilometers results in an orbit that may be described by very simple mathematics. Each GPS satellite has a very precise orbit according to the GPS master plan. On the ground, all GPS receivers have an almanac programmed into their computers that tells them where each satellite is at each moment. Also, the GPS satellites are constantly monitored by the Department of Defense by precise radar to check each satellite's exact altitude, position and speed. Any errors from the predicted orbit are called ephemeris errors because they affect the satellite's orbit, or ephemeris. These errors are caused by the gravitational attraction of the moon and the sun and by the pressure of solar radiation on the satellites. The ephemeris errors are usually very slight but must be taken into account to achieve a high accuracy. Once the satellite's exact position has been measured, the ephemeris information is transmitted to the satellite itself. The satellite then includes this new corrected position information in the pseudo-random code signals that it broadcasts.

As described above, the distance from the GPS receiver to a satellite is calculated by multiplying the travel time of the radio signal by the speed of light. However, the speed of light is only constant in a vacuum. As a GPS signal passes through charged particles of the ionosphere and through water vapor in the troposphere, the signal travels slower than in a vacuum, and this creates an error in the measurement. One way to minimize this speed error is to predict what a typical speed of light might be on a typical day, however, atmospheric conditions are rarely exactly typical. Another way to minimize speed error is to compare the relative speeds of two different signals.

Another type of propagation error occurs when the GPS signal is reflected from various local obstructions before it gets to the GPS receiver. This is called multipath error, which interferes with the GPS signal in a manner similar to the ghosting interference that occurs in television reception. Signal rejection techniques may be utilized to minimize this problem.

The atomic clocks in the GPS satellites are extremely precise but they are not perfect. Minute discrepancies can occur, and these translate into travel time measurement errors, and even though the positions of the satellites are constantly monitored, slight position or "ephemeris" errors may occur between monitoring times.

Another source of error is that the geometry of the GPS satellites relative to the GPS receiver can magnify the time measurement errors with a principle called "Geometric Dilution of Precision" or GDOP. If the GPS receiver selects satellites that are close together in the sky, the intersecting circles that define the GPS receiver's position will cross one another at very shallow angles, increasing the ambiguity of the point of intersection. One the other hand, if the GPS receiver selects satellites that are widely separated, then the circles intersect at almost right angles, which minimizes the ambiguity.

Differential GPS, or DGPS, can yield measurements accurate to a couple meters in moving applications and even better in stationary situations. In differential GPS, a stationary GPS receiver is required in addition to the GPS receiver that is measuring its position. Because CDMA communications systems already include a stationary base station, differential GPS may be readily implemented for each mobile station. As described above, GPS receivers use timing signals from typically four satellites to determine a position. Because each of the four timing signals is subject to some error, the position calculation results in a compounding of the errors. A method of correcting these errors is to include an additional stationary GPS receiver in the base station as a reference. If the base station and the mobile station are fairly close to each other, say within a few hundred kilometers, the signals that reach both of them from the same satellite will have traveled through virtually the same slice of atmosphere, and therefore will have almost identical errors. The base station receives the same GPS signals as the mobile station, however, instead of using timing signals to calculate its position, the base station uses its known position to calculate what the travel time should be and compares the predicted travel time with the measured travel time. The difference between the predicted travel time and the measured travel time is transmitted to the mobile station. The mobile station applies the corrections to its travel time measurements and calculates its position from the corrected time measurements. The base station may predict from a previously known position of the mobile station which of the many available satellites the mobile station should use to calculate its position and only send the errors for those specific satellites to the mobile station, or the reference receiver may compute the errors for all of the available satellites and transmit all the error information to the mobile station. Alternatively, the mobile station may transmit the travel time measurements to the base station so that the base station can apply the corrections and calculate the position of the mobile station.

Even further accuracy may be obtained for GPS measurements by using the GPS carrier frequency. As explained above, a GPS receiver determines the travel time of a signal from a satellite by comparing a pseudo-random code with an identical code in the signal from the satellite. The GPS receiver delays its copy of the pseudo-random code later and later in time until it matches up with the satellite signal. The amount of delay applied to the copy is equal to the signal travel time from the satellite. The bits (or cycles) of the pseudo-random code are about a microsecond wide, however, so wide that even if the codes are matched, there is still the possibility of a 300 meter error. Code-phase GPS receivers can reduce the phase error to one or two percent, or 3–6 meters of error. Carrier-phase GPS receivers use both the pseudo-random code delay information and then perform measurements on the carrier frequency that is modulated by that code. The carrier frequency is much higher than the bits (or cycles) of the pseudo-random code, typically about 1.57 Ghz, which provides more accurate phase matching. Using a technique similar to code-phase receivers to achieve an accuracy of one or two percent phase matching, an accuracy of 3 or 4 millimeters may be realized for surveying, scientific, and other demanding applications. In essence this technique counts the exact number of carrier cycles between the satellite and the receiver. If the pseudo-random code measurement can be made accurate to say, a couple meters, then only a few wavelengths of the carrier signal have to be counted to determine which cycle actually marks the starting edge of the timing signal.

GPS used in conjunction with communication links such as CDMA communications systems can provide the backbone for systems tailored to applications in agriculture, mass transit, urban delivery, public safety, and vessel and vehicle tracking.

A modern development in cellular telephone technology is the incorporation of global positioning system (GPS) circuitry in a code division multiple access (CDMA) chip set for mobile stations so that the same radio frequency (RF) components in mobile stations may be used for both CDMA service and global positioning system functions. The global positioning system function has many applications, including supporting emergency 911 calls and other location services. Because the same radio frequency (RF) components are used for both CDMA service and Global Positioning System functions on different frequency channels, the mobile station cannot receive and respond to transmissions from the base station during the time the global positioning system function is being used to measure the mobile station location.

SUMMARY OF THE INVENTION

In one aspect of the present invention, a method of synchronizing measurement of a mobile station location includes transmitting a synchronization message from a mobile station to a base station to indicate that the mobile station will be unavailable for communication services during a selected time interval, and measuring the mobile station location during the selected time interval.

In various embodiments of the present invention, the synchronization message indicates a system time when the selected time interval will start and when the selected time interval will end; the selected time interval is synchronized with system time in units of about 80 milliseconds each; common radio frequency components in the mobile station are used for performing communications service and for measuring the mobile station location; forward channel traffic from the base station to the mobile station is withheld during the selected time interval; and the base station does not transmit to the mobile station during the selected time interval, thereby avoiding unnecessary expenditure of power. A fade timer may be reset to the selected time interval to avoid dropping a call during the selected time interval. In the currently preferred embodiment, measuring the mobile station location is performed by the mobile station using the Global Positioning System (GPS), and the communications service is performed using code division multiple access (CDMA) protocol.

DESCRIPTION OF THE DRAWINGS

The present invention is illustrated by way of example and not limitation in the accompanying figures, in which like references indicate similar elements throughout the several views of the drawings, and in which:

FIG. 1 illustrates synchronizing CDMA communications service and measuring the location of a mobile station with the Global Positioning System (GPS) in accordance with an embodiment of the present invention; and FIG. 2 illustrates a flow chart of a method of synchronizing measurement of a mobile station location with communications service according to an embodiment of the present invention.

FIGS. 3, 4, 5, 6, 7, 8, 9, 10, 11 and 12 illustrate a proposed modification to the current CDMA service standard, TIA/EIA/IS2000.5-A, in accordance with an embodiment of the present invention.

Elements in the figures are illustrated for simplicity and clarity and have not necessarily been drawn to scale. For example, the dimensions of some of the elements in the figures may be exaggerated relative to other elements to help to improve understanding of the following description of the illustrated embodiments.

DESCRIPTION OF THE ILLUSTRATED EMBODIMENTS

According to previous CDMA service and related Global Positioning System search methods, the base station is not aware of the time during which the mobile station is off-line from the CDMA frequency channel to use the global positioning system frequency channel. Furthermore, because the time interval during which the global positioning system function is being used by the mobile station is not communicated to the base station, the mobile station is off-line from CDMA service for an unspecified period of time. The period of time during which the mobile station can be off-line from CDMA service is limited to five seconds by the parameter $T_{SM}$, which is related to the Call Drop Timer. In the IS2000 B protocol, the off-line period will be constrained by the Rescue Channel Timer. According to the Rescue Channel procedure, the base station may start to allocate resources to rescue the mobile station within a rescue delay time commencing from the time the mobile station reverse link has not been received and decoded.

Two types of location services are widely considered. The first is an autonomous GPS receiver having its own radio frequency, baseband, and control processing. The second is an embedded GPS receiver that shares the radio frequency and control processing with code division multiple access (CDMA) processing. The second type of GPS based location service dramatically reduces service costs due to the sharing of the radio frequency and control processing with regular CDMA functions. However, because the radio frequency circuitry is off the CDMA frequency for frequent measurement periods each requiring several seconds to perform the GPS location functions, a significant loss in the CDMA service quality may be experienced. The consequences of unsupervised visits to the GPS frequency may severely disrupt not only normal voice and data services, but also such vital services as an emergency E911 call for which the location service was required in the first place.

Measuring the mobile station position using the Global Positioning System requires one or more uses of the Global Positioning System frequency channel for up to several seconds to achieve the desired position accuracy. The minimum performance specification for response time in according to IS-801 is 16 seconds. This period may be divided into smaller segments in accordance with the present invention to allow concurrent performance of Global Positioning System functions and CDMA communication services. The unsynchronized absences of the mobile stations from CDMA service resulting from using the Global Positioning System function substantially degrade the performance of the CDMA network. The adverse effects of the unsynchronized absences of the mobile stations from CDMA service on the performance of the CDMA network may be summarized as follows:

(1) The system throughput for all packet users is degraded due to collisions between the mobile station location measurements and the packet transmission scheduling algorithm. Except for round-robin scheduling, the degradation of system throughput extends not only to the off-line mobile station, but to the entire sector.

(2) The interval during which the mobile station is off-line from CDMA service may trigger the rescue channel procedure, which strains the base station resources and prevents allocating these resources to mobile stations for which the rescue channel procedure is needed.

(3) A long disruption in processing of reverse and forward power control will increase the probability of an outage due to incorrect transmit power and/or drift in the outer loop set point when the mobile station returns to the CDMA channel frequency.

To mitigate the adverse effects of the Global Positioning System function on CDMA service or the absence from CDMA during E911 calls, a new procedure is presented in accordance with an embodiment of the present invention in which the time and duration of the Global Positioning System function performed by each mobile station is communicated in advance by a synchronization message to the base station, and the off-line period is synchronized to the system time, for example, in units of 80 milliseconds.

Accordingly, the base station scheduling algorithm can utilize the information in the synchronization message in allocating resources for the forward traffic channel as well as for the rescue channel. For example, the base station can delay scheduling transmissions to mobile stations during their off-line periods, reducing contention for resources among the mobile stations and avoiding unnecessary retransmission of lost packets. Also, both the mobile station and the base station are informed that the mobile station has not lost the forward traffic channel.

FIG. 1 illustrates synchronizing CDMA communications service and measuring the location of a mobile station with the Global Positioning System (GPS) in accordance with an embodiment of the present invention. Shown in FIG. 1 are a base station 102, a GPS satellite 104, a mobile station 106, a GPS signal 108, a forward traffic channel 110, and a reverse link 112.

The base station 102 may communicate with the mobile station 106 by an antenna or by other well known means for transmitting and receiving CDMA communications signals.

In operation, communications service is performed between the base station and the mobile station. For example, the base station 102 transmits data packets and control messages to the mobile station 106 and receives data packets and control messages from the mobile station 106 according to a standard protocol, such as code division multiple access (CDMA). When the location of the mobile station 106 is desired, the mobile station 106 transmits a synchronization message to the base station 102 to indicate that the mobile station will be unavailable for communications service during a selected time interval. The synchronization message preferably includes the start time and the duration of the selected time interval in system time units, or it may indicate that a periodic search is to be performed. The duration may also be expressed as an end time. A system time unit is typically 80 milliseconds. During the selected time interval, the mobile station location is measured, preferably using the Global Positioning System. At the end of the selected time interval, the mobile station transmits the mobile station location to the base station. Alternatively, the mobile station may transmit the raw data measurements to the base station. The base station can calculate the location of the mobile station, thereby reducing the complexity and corresponding cost of the mobile station.

When the mobile station location is not being measured, that is, outside the selected time interval, communications service is resumed between the mobile station and the base station. The selected time interval is preferably synchronized with a system time kept by the base station, so that the start time of the selected time interval coincides with the beginning of a system time unit, and the end time of the selected time interval coincides with the end of a system time unit.

Advantageously, common radio frequency components may be used in the mobile station for both performing communications service outside the selected time interval and for measuring the mobile station location within the selected time interval. Also, forward channel traffic from the base station to the mobile station may be withheld during the selected time interval and the base station may disable transmissions to the mobile station during the selected time interval to avoid unnecessary repetition of data transmission and rescue procedures and to improve system capacity and/or throughput. Also, the base station may allocate the selected time interval for communication with another mobile station. Upon receipt of a synchronization message, the fade timer may be reset to the selected time interval to avoid dropping a call during the selected time interval.

Other location methods besides the Global Positioning System may be used to practice various embodiments of the present invention. In fact, in certain applications, the synchronization message may be used to indicate that the mobile station will be unavailable for communications service during a selected time interval to perform a function other than measuring the mobile station location, for example, to switch from CDMA service to a two-way radio or walkie-talkie function.

FIG. 2 illustrates a flow chart of a method of synchronizing measurement of a mobile station location with communications service according to an embodiment of the present invention.

Step 202 is the entry point of the flow chart 200.

In step 204, a synchronization message is transmitted from a mobile station to a base station to indicate that the mobile station will be unavailable for communications service during a selected time interval. The synchronization message is typically transmitted in advance during communications service to allow the base station time to adjust its schedule to accommodate the off-line time of the mobile station. Also, the selected time interval is preferably expressed as a start time and a duration or end time in system time units or frames, typically 80 milliseconds each. This ensures that the selected time interval is synchronized to the system clock kept by the base station so that no data is lost between the base station and the mobile station in the middle of a time frame.

In step 206, the base station resets the fade timer to the selected time interval to avoid dropping a call during the selected time interval.

In step 208, the mobile station location is measured during the selected time interval. Typically, this is done by using the Global Positioning System function incorporated in the mobile station circuitry and common radio frequency components also used for communications service.

In step 210, the mobile station transmits the measured mobile station location or the raw data measurements for calculating the measured mobile station location to the base station at the end of the selected time interval.

In step 212, the base station receives the measured mobile station location or the raw data measurements and resumes communications service with the mobile station.

Step 214 is the exit point of the flow chart 200.

Although the method of the present invention illustrated by the flowchart description above is described and shown with reference to specific steps performed in a specific order, these steps may be combined, sub-divided, or reordered without departing from the scope of the claims. Unless specifically indicated herein, the order and grouping of steps is not a limitation of the present invention.

FIGS. 3, 4, 5, 6, 7, 8, 9, 10, 11 and 12 illustrate a proposed modification to the current CDMA service standard, TIA/EIA/IS2000.5-A, for supporting GPS functions in accordance with an embodiment of the present invention.

In the proposed modification illustrated in FIG. 3, § 1.1.2.2, CDMA Numeric Information, the CDMA off time report supported indicator and the off time report threshold are defined.

In the proposed modification illustrated in FIG. 4, § 2.6.2.2.5, Extended System Parameters Message, the mobile station stores additional parameters. In the proposed modification illustrated in FIG. 5, § 2.6.2.2.14.1, Stored Parameters, the mobile station stores additional parameters.

In the proposed modification illustrated in FIG. 6, § 2.6.4.3, Traffic Channel Substate, the mobile station sends an off time report message to the base station.

In the proposed modification illustrated in FIG. 7, § 2.7.2.3.2.40, CDMA Off Time Report Message, the format of the CDMA off time report message is defined.

In the proposed modification illustrated in FIG. 8, § 2.7.2.3.2.40-1, the format of the time unit used in FIG. 7 is defined.

In the proposed modification illustrated in FIG. 9, § 3.6.4.3, Traffic Channel Substate, the base station processing of messages from the mobile station is defined.

In the proposed modification illustrated in FIG. 10, § 3.7.2.3.2.13, Extended System Parameters Message, a format of an Extended System Parameters Message is defined to support global positioning functions.

In the proposed modification illustrated in FIG. 11, § 3.7.2.3.2.13-5, CDMA Off Time Report Threshold Unit, the time unit of the CMDA_OFF_TIME_REP_UNIT is defined.

In the proposed modification illustrated in FIG. 12, § 3.7.2.3.2.31, MC-RR Parameters Message, parameters are defined in a specified format.

Benefits of the proposed modifications in FIGS. 3, 4, 5, 6, 7, 8, 9, 10, 11 and 12 include allowing both sides of a call to know that the mobile station has not lost the Traffic Channel. This is especially true for emergency E911 calls to avoid unnecessary execution of Rescue Channel operations. In data services, the base station scheduler is relieved from scheduling for mobile stations performing global positioning functions. In addition, the base station is allowed to stop transmitting on the forward link during global positioning searches, thereby improving system capability by reducing interference to other mobile stations.

While the invention herein disclosed has been described by means of specific embodiments and applications thereof, numerous modifications and variations could be made thereto by those skilled in the art without departing from the scope of the invention set forth in the following claims.

What is claimed is:

1. A method of synchronizing measurement of a mobile station location comprising:
    transmitting a synchronization message from a mobile station to a base station to indicate that the mobile station will be unavailable for communications service during a selected time interval;
    resetting a fade timer to the selected time interval to avoid dropping a call during the selected time interval; and
    measuring the mobile station location during the selected time interval.

2. The method of claim 1 further comprising transmitting the mobile station location or raw data measurements for calculating the measured mobile station location from the mobile station to the base station at the end of the selected time interval.

3. The method of claim 1 further comprising performing communications service between the mobile station and the base station outside the selected time interval.

4. The method of claim 1 wherein transmitting the synchronization message includes indicating a system time at which the selected time interval starts.

5. The method of claim 4 wherein transmitting the synchronization message includes indicating a system time of a duration or end time at which the selected time interval ends.

6. The method of claim 1 further comprising synchronizing the selected time interval with a system time kept by the base station.

7. The method of claim 6 wherein the system time has units of about 80 milliseconds each.

8. The method of claim 1 further comprising using common radio frequency components in the mobile station for both communications service and measuring the mobile station location.

9. The method of claim 1 further comprising withholding forward channel traffic from the base station to the mobile station during the selected time interval.

10. The method of claim 1 wherein measuring the mobile station location comprises receiving signals from a Global Positioning System.

11. The method of claim 1 wherein performing the communications service comprises transmitting and receiving data packets and control messages according to code division multiple access protocol.

12. The method of claim 11 wherein the code division multiple access protocol comprises a CDMA_OFF_TIME defining a total time during which a mobile station is not available for performing the communications service.

13. The method of claim 11 wherein the mobile station enables, disables, and resets the fade timer to support global positioning functions.

14. The method of claim 11 further comprising defining a format for a code division multiple access off time report message to support global positioning functions.

15. The method of claim 11 further comprising defining a format of an Extended System Parameters Message to support global positioning functions.

16. The method of claim 11 further comprising defining a format of a System Parameters Message to support global positioning functions.

17. The method of claim 1 wherein transmitting the synchronization message includes indicating a periodic search.

18. The method of claim 1 wherein the mobile station performs a function on a channel other than that used by the base station to communicate with the mobile station.

19. The method of claim 18 wherein the function is two-way radio or walkie-talkie.

20. The method of claim 1 wherein the base station allocates the selected time interval for communication with another mobile station.

21. The method of claim 1 wherein the base station disables transmission to the mobile station.

* * * * *